(12) United States Patent
Jiang et al.

(10) Patent No.: US 10,185,098 B2
(45) Date of Patent: Jan. 22, 2019

(54) OPTICAL FIBER CONNECTOR DEVICE

(71) Applicants: Amphenol Fiber Optic Technology (Shenzhen) Co., Ltd., Shenzhen, Guangdong Province (CN); Gloriole Electroptic Technology Corp., Kaohsiung (TW)

(72) Inventors: Bo-Lin Jiang, Shenzhen (CN); Song-Sheng Li, Shenzhen (CN); Min Chen, Shenzhen (CN); Ling-Hua Zhu, Shenzhen (CN)

(73) Assignees: AMPHENOL FIBER OPTIC TECHNOLOGY (SHENZHEN) CO., LTD., Shenzhen, Guangdong Province; GLORIOLE ELECTROPTIC TECHNOLOGY CORP., Kaohsiung ( * ) Notice: Subject to any disclaimer, the term of this patent is extended or adjusted under 35 U.S.C. 154(b) by 0 days.

(21) Appl. No.: 15/233,399

(22) Filed: Aug. 10, 2016

(65) Prior Publication Data
US 2017/0242196 A1 Aug. 24, 2017

(30) Foreign Application Priority Data
Feb. 24, 2016 (TW) .............................. 105202553 U

(51) Int. Cl.
*G02B 6/38* (2006.01)
(52) U.S. Cl.
CPC ........... *G02B 6/387* (2013.01); *G02B 6/3825* (2013.01); *G02B 6/3887* (2013.01)
(58) Field of Classification Search
CPC .... G02B 6/3825; G02B 6/387; G02B 6/3874; G02B 6/3887
See application file for complete search history.

(56) References Cited

U.S. PATENT DOCUMENTS

| 4,579,418 | A | * | 4/1986 | Parchet | G02B 6/3831 385/60 |
| 5,142,602 | A | * | 8/1992 | Cabato | G02B 6/32 385/81 |
| 7,654,747 | B2 | * | 2/2010 | Theuerkorn | G02B 6/3821 385/53 |
| 2009/0269014 | A1 | * | 10/2009 | Winberg | G02B 6/3846 385/78 |
| 2011/0222819 | A1 | * | 9/2011 | Anderson | G02B 6/3825 385/78 |
| 2013/0121647 | A1 | * | 5/2013 | Lin | G02B 6/3869 385/78 |
| 2014/0286611 | A1 | * | 9/2014 | Pratt | G02B 6/3887 385/78 |

* cited by examiner

*Primary Examiner* — Thomas A Hollweg
*Assistant Examiner* — Mary A El-Shammaa

(57) ABSTRACT

An optical fiber connector device includes an optical fiber connector and an insert unit. The insert unit hash a housing and a connecting mechanism. The housing surrounds an axis, and has an outer wall, a surrounding wall, and a cover member. The outer wall defines a first insert opening on the axis, and has a main opening spaced apart from the axis. The outer wall and the surrounding wall are molded as one piece. The cover member covers removably the main opening. The connecting mechanism has a first connecting member surrounded by the outer wall and connected to the optical fiber connector, and a second connecting member surrounded by the surrounding wall, coupled to the first connecting member, and adapted to be connected to another optical fiber connector.

3 Claims, 4 Drawing Sheets

OPTICAL FIBER CONNECTOR DEVICE

CROSS-REFERENCE TO RELATED APPLICATION

This application claims priority of Taiwanese Patent Application No. 105202553, filed on Feb. 24, 2016.

FIELD

The disclosure relates to a connector device, and more particularly to an optical fiber connector device.

BACKGROUND

Referring to FIG. 1, Taiwanese Utility Model Patent No. M445188 discloses a conventional optical fiber connector device 1 which includes a housing 11, a seat unit 12 removably connected with the housing 11, a connecting unit 13 disposed in the seat unit 12, a fixing unit threadedly connected to the housing 11, and a dust-proof cover 15.

Since a surrounding wall 121 and a cover 122 of the seat unit 12 of the optical fiber connector device 1 are designed to be individual elements and engageable with each other, the assembly of the connecting unit 13 therewith is simplified, without the need for welding, so that deformation and other effects caused by heat from welding can be avoided.

However, in the conventional optical fiber connector device 1, not only does the seat unit 12 need to be assembled with the connecting unit 13, the seat unit 12 and the housing 11 also need to undergo assembly. This not only makes the assembly process more time and effort-consuming, but also causes dimensional tolerance to accumulate due to the large number of requisite components, which negatively affects the transmission efficiency and water-resistance of the optical fibers.

SUMMARY

Therefore, an object of the disclosure is to provide an optical fiber connector device that can alleviate at least one of the drawbacks of the prior art.

According to the disclosure, an optical fiber connector device includes an optical fiber connector and an insert unit. The insert unit has a housing and a connecting mechanism. The housing surrounds an axis, and has an outer wall that defines a first insert opening on the axis and that is formed with a main opening spaced apart from the axis, a surrounding wall that surrounds the axis, that is connected to the outer wall, and that defines a second insert opening on the axis, and a cover member that covers removably the main opening. The optical fiber connector extends into the first insert opening. The outer wall and the surrounding wall are molded as one piece.

The connecting mechanism includes a first connecting member surrounded by the outer wall and connected to the optical fiber connector, and a second connecting member stir rounded by the surrounding wall, coupled to the first connecting member, and adapted to be connected to another optical fiber connector.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
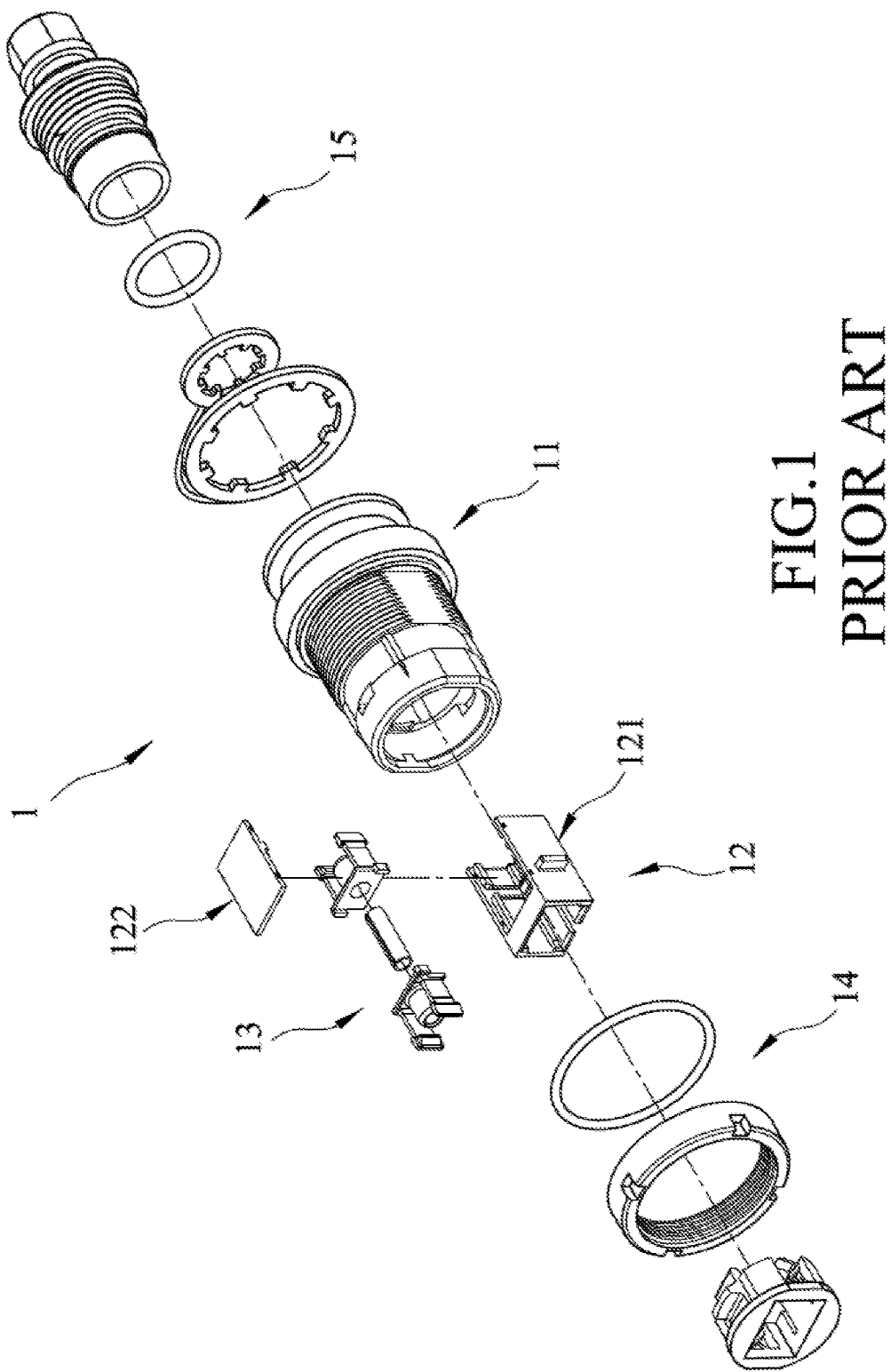
FIG. 1 is an exploded perspective view of a conventional optical fiber connector device of Taiwanese Utility Model Patent No. M445188.
Figure 2:
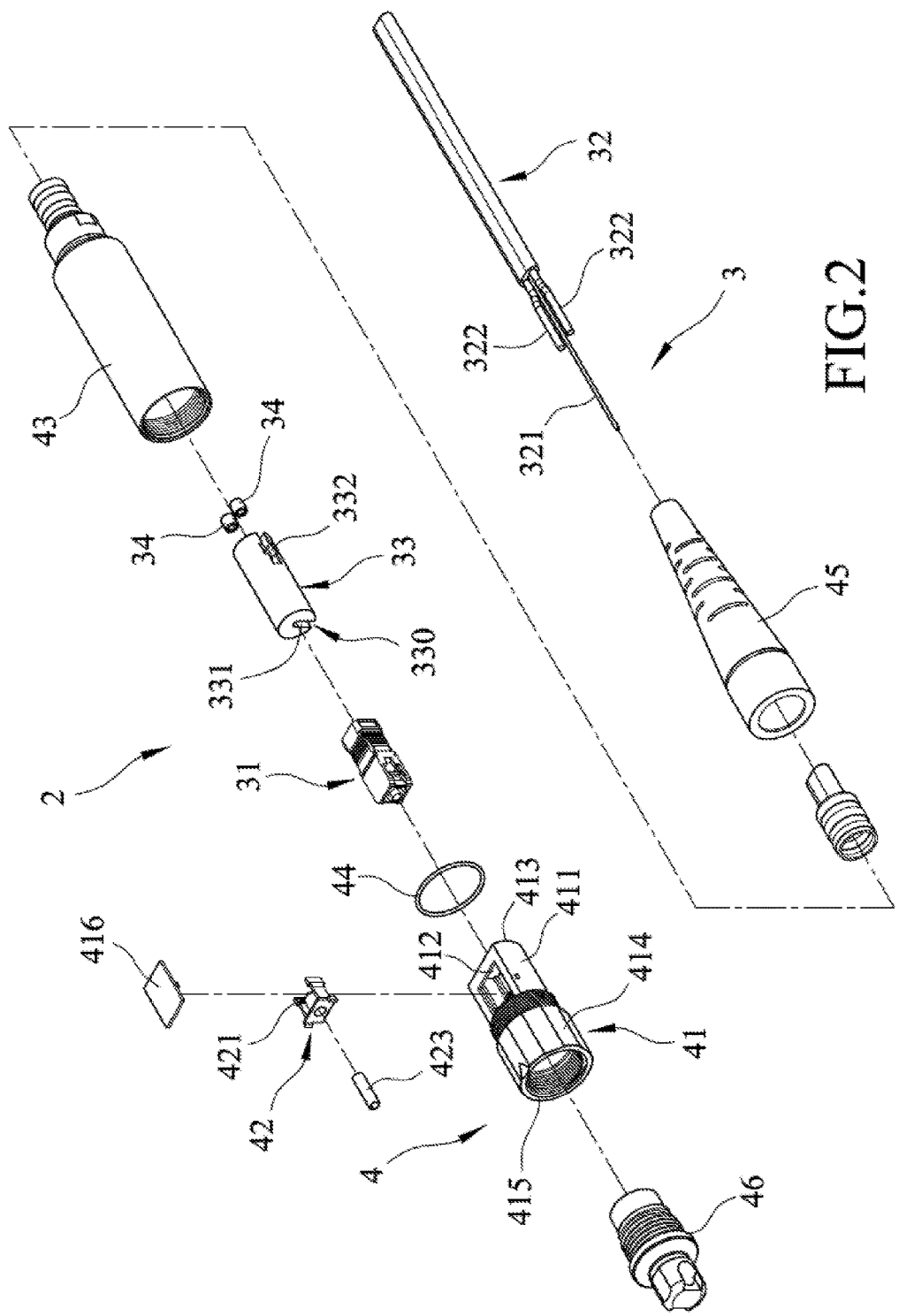
FIG. 2 is an exploded perspective view illustrating an embodiment of an optical fiber connector device according to the disclosure.
Figure 3:
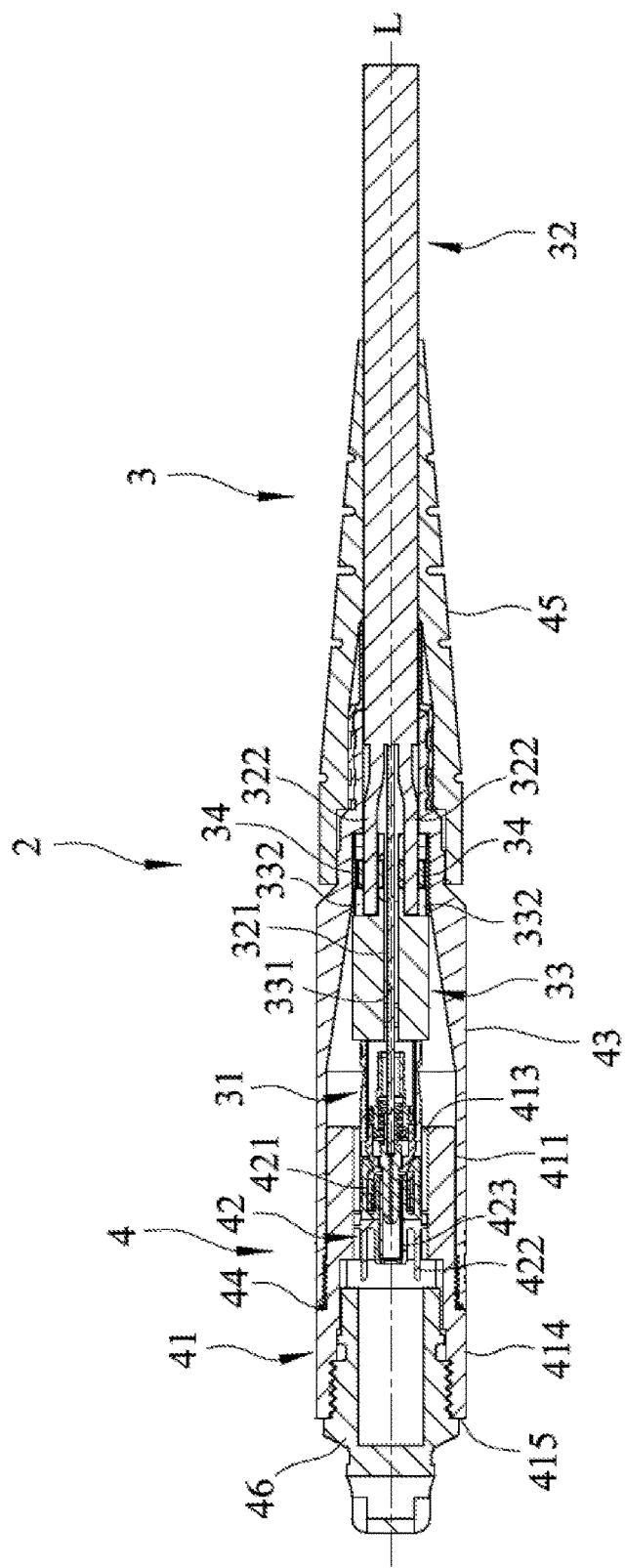
FIG. 3 is a sectional view illustrating the embodiment in an assembled state.
Figure 4:
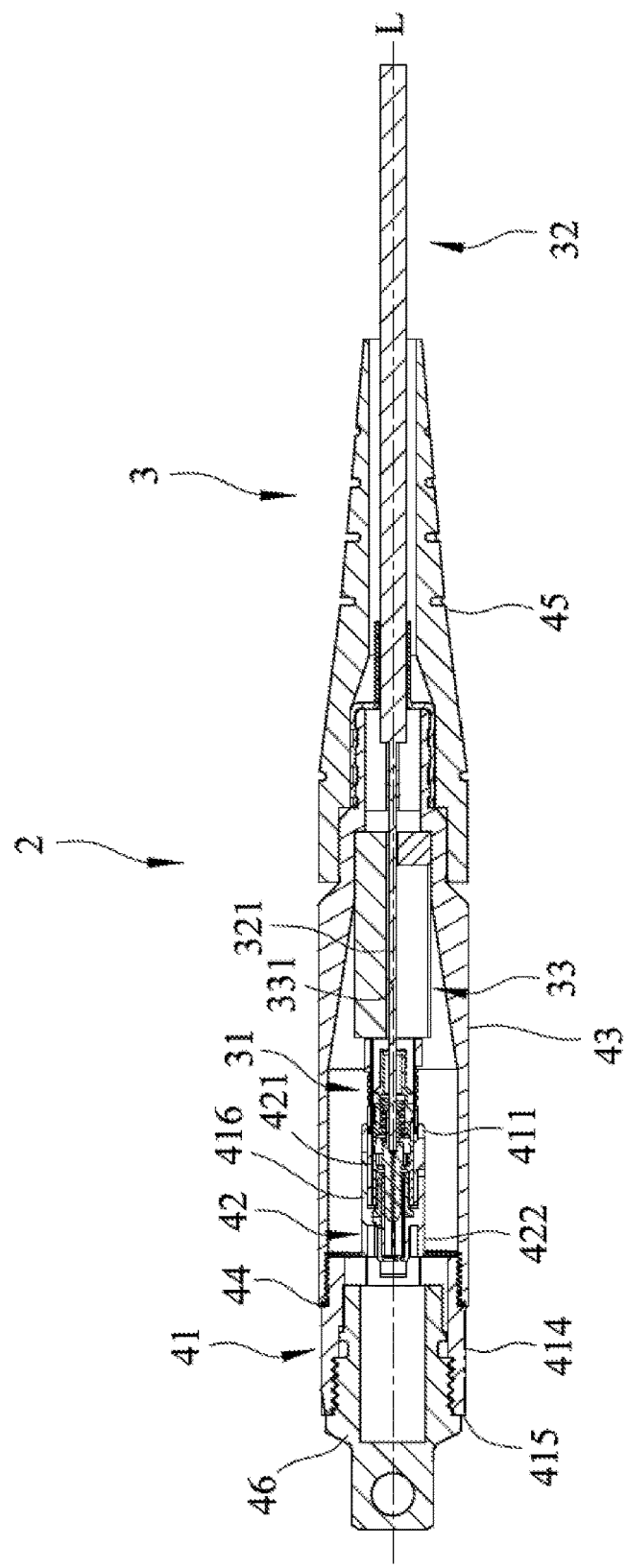
FIG. 4 is another sectional view illustrating the embodiment in the assembled state.

Referring to FIGS. 2, 3, and 4, an embodiment of an optical fiber connector device 2 includes an optical fiber connector 3, and an insert unit 4.

The optical fiber connector 3 has a standard connector member 31 extending along an axis (L), an optical fiber cable 32 connected to the standard connector member 31, a guide member 33 abutting against the standard connector member 31 and disposed for facilitating connection between the optical fiber cable 32 and the standard connector member 31, and two reinforcing rings 34 embedded in the guide member 33.

The optical fiber cable 32 has an optical fiber part 321 and two reinforcing parts 322. The guide member 33 is formed with a groove unit 330 which extends along the axis (L) and through which the optical fiber cable 32 extends. The groove unit 330 has a guide groove 331 for the optical fiber part 321 of the optical fiber cable 32 to extend through and connect with the standard connector member 31, and two fixing grooves 332 for the reinforcing parts 322 to be respectively sleeved with the reinforcing rings 34 and fitted respectively into.

By sleeving the reinforcing rings 34 on the reinforcing parts 322 of the optical fiber cable 32 and tightly fitting the two into the fixing grooves 332, the pull-resistance of the optical fiber cable 32 is enhanced.

The insert unit 4 has a housing 41 that surrounds the axis (L), a connecting mechanism 42, a tail tube 43 connected threadedly to the housing 41, a watertight ring 44 disposed between the tail tube 43 and the housing 41, a tail cover 45 connected to an end of the tail tube 43 that is opposite to the housing 41 and sleeved on the optical fiber cable 32 so that the optical fiber cable 32 protrudes therefrom, and a dust-proof cover 46 removably covering the housing 41. The guide member 33 is surrounded by and positioned fixedly relative to the tail tube 43.

The housing 41 has an outer wall 411 that defines a first insert opening 413 on the axis (L), and that is formed with a main opening 412 spaced apart from the axis (L), a surrounding wall 414 that surrounds the axis (L), that is connected to the outer wall 411, and that defines a second insert opening 415 on the axis (L), and a cover member 416 that removably covers the main opening 412. The outer wall 411 and the surrounding wall 414 are molded as one piece. The dust-proof cover 46 removably covers the housing 41 at the second insert opening 415.

The connecting mechanism 42 includes a first, connecting member 421, a second connecting member 422, and a linking tube 423. The first connecting member 421 is disposed in and surrounded by the outer wall 411 to connect to the standard connector member 31 of the optical fiber connector 3, which extends into the first insert opening 413. The second connecting member 422 is surrounded by the surrounding wall 414, coupled to the first connecting member 421, and adapted to be connected to another optical fiber connector through the second insert opening 415. The linking tube 423 has opposite end portions that are inserted respectively into the first and second connecting members 421, 422.

In this embodiment, the first connecting member 421 is configured as a standard cable holder, while the second connecting member 422 is configured as an optical fiber adapter.

In use, the dust-proof cover 46 is removed from the second insert opening 415 so that the another optical fiber connector (not shown) corresponding to the optical fiber adapter (i.e. the second connecting member 422) can be inserted in the second insert opening 415 to be engaged with the optical fiber adapter (i.e. the second connecting member 422) and be coupled with the standard connector member 31 of the optical fiber connector 3.

In sum, by virtue of the housing 41 of the optical fiber connector device 2 being formed as one piece, the number of requisite components are reduced. This not only allows the assembly process to be simplified, but prevents dimensional tolerance from accumulating, thereby improving the transmission efficiency and water-resistance of the optical fibers.

In the description above, for the purposes of explanation, numerous specific details have been set forth in order to provide a thorough understanding of the embodiment. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector device comprising:
   an optical fiber connector; and
   an insert unit including
   a housing that surrounds an axis, and that has
   an outer wall defining a first insert opening on the axis, and formed with a main opening that is spaced apart from the axis, said optical fiber connector extending into said first insert opening,
   a surrounding wall surrounding the axis, connected to said outer wall, and defining a second insert opening on the axis, said outer wall and said surrounding wall being molded as one piece, and
   a cover member covering removably said main opening, and
   a connecting mechanism that includes
   a first connecting member surrounded by said outer wall and connected to said optical fiber connector, and
   a second connecting member surrounded by said surrounding wall, coupled to said first connecting member, and adapted to be connected to another optical fiber connector;
   wherein said optical fiber connector includes
   a standard connector member extending into said first insert opening of said housing, and connected to said first connecting member,
   an optical fiber cable connected to said standard connector member, and
   a guide member abutting against said standard connector member;
   wherein said guide member is formed with a groove unit which extends along the axis, and through which said optical fiber cable extends for facilitating connection between said optical fiber cable and said standard connector member; and
   wherein said connecting mechanism of said insert unit further includes a linking tube having opposite end portions that are inserted respectively into said first and second connecting members.

2. The optical fiber connector device as claimed in claim 1, wherein said insert unit further includes:
   a tail tube connected threadedly to said housing, said guide member being surrounded by and positioned fixedly relative to said tail tube;
   a watertight ring disposed between said tail tube and said housing; and
   a tail cover connected to an end of said tail tube that is opposite to said housing, and sleeved on said optical fiber cable.

3. The optical fiber connector device as claimed in claim 1, wherein:
   said first connecting member is configured as a standard cable holder; and
   said second connecting member is configured as an optical fiber adapter.

* * * * *